United States Patent [19]
Cecchetti

[11] 3,979,119
[45] Sept. 7, 1976

[54] GAME BOARD STRUCTURE

[76] Inventor: Claudio Cecchetti, Via Verdi 54, Cernusco sul Naviglio, Italy, 20063

[22] Filed: June 3, 1974

[21] Appl. No.: 475,692

[30] Foreign Application Priority Data
Oct. 30, 1973 Italy .......................... 22631/73[U]

[52] U.S. Cl. .................... 273/121 R; 24/73 PF; 46/25; 248/188; 273/3 C; 273/129 R
[51] Int. Cl.² ........................................ A63D 13/00
[58] Field of Search .............. 273/3 C, 113, 118 R, 273/118 A, 118 D, 119 R, 119 A, 119 B, 120 R, 120 A, 121 R, 121 A, 121 D, 121 E, 122 R, 122 A, 123 R, 123 A, 124 R, 124 A, 125 R, 125 A, 126 R, 126 A, 127 R, 127 B, 127 C, 129; 124/16; 108/156; 248/188; 46/25, 30; 74/503; 24/73 P, 73 PF, 90 F; D34/3, 5 J

[56] References Cited
UNITED STATES PATENTS

| | | | |
|---|---|---|---|
| 1,971,545 | 8/1934 | Tompkins | 46/25 |
| 2,634,129 | 4/1953 | Lohr et al. | 273/121 R |
| 3,090,622 | 5/1963 | Sire | 273/126 A |
| 3,234,566 | 2/1966 | Rupp | 74/503 UX |
| 3,404,888 | 10/1968 | Lally et al. | 273/121 A |
| 3,516,633 | 6/1970 | Blackwood | 248/188 |
| 3,610,625 | 10/1971 | Erno et al. | 273/126 R |
| 3,687,092 | 8/1972 | Manning | 108/156 |

FOREIGN PATENTS OR APPLICATIONS

| | | | |
|---|---|---|---|
| 2,161,963 | 6/1972 | Germany | 273/121 R |
| 315,343 | 9/1956 | Switzerland | 46/30 |

*Primary Examiner*—Richard C. Pinkham
*Assistant Examiner*—Richard T. Stouffer
*Attorney, Agent, or Firm*—Guido Modiano; Albert Josif

[57] ABSTRACT

Game board structure, comprising a support frame constructed in a single piece, a playing surface supported by the frame, a device for propelling a ball on to the playing surface, a pair of repelling arms disposed close to one end of the playing surface, and pushbuttons for operating the repelling arms. It comprises also a plurality of obstacles having shaped feet of resilient material for being irremovably insertable by pressure into holes provided in the playing surface.

It is of extremely simplified construction, in fact; for example, by using a lever provided with two spaced holes, the use of different shapes of levers for the left and right pushbutton is avoided. In addition, the overall dimensions of the game board structure are reduced for package purposes to just the dimensions of the support frame because those normally projecting parts are in this invention completely housed in the body of the game board structure.

5 Claims, 17 Drawing Figures

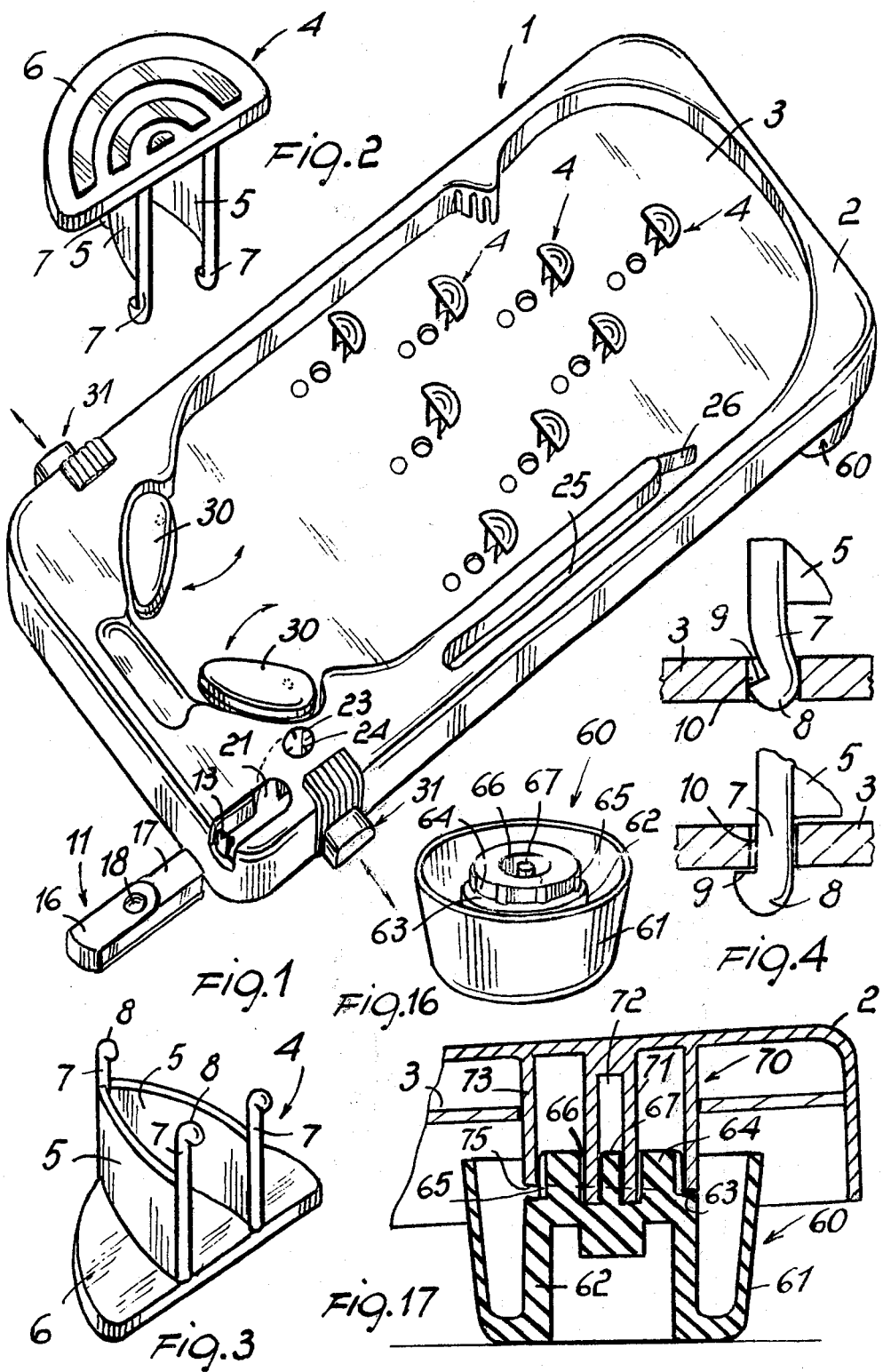

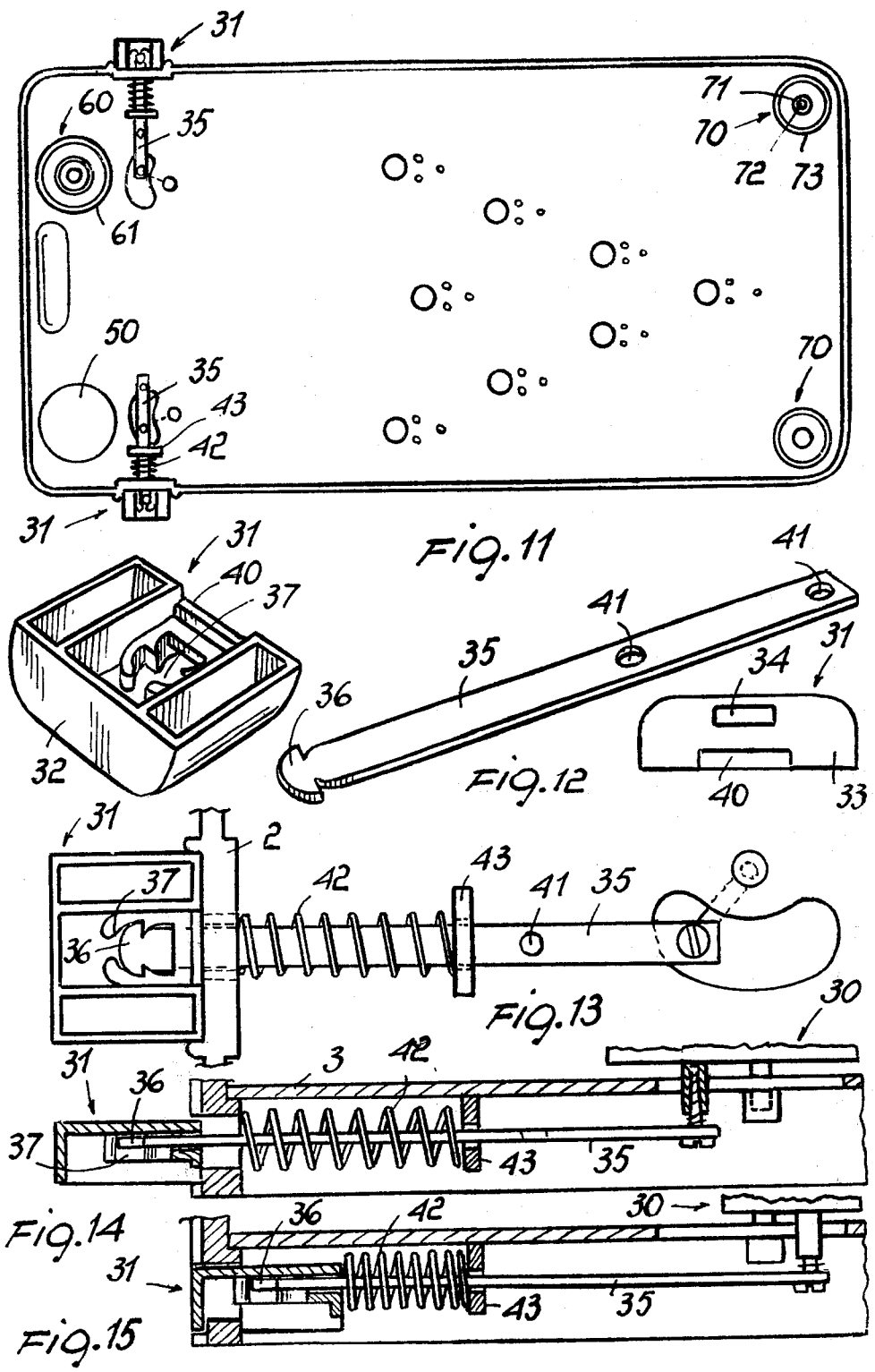

GAME BOARD STRUCTURE

BACKGROUND OF THE INVENTION

This invention relates to a game board structure like a bagatelle table.

SUMMARY OF THE INVENTION

The object of this invention is to provide a bagatelle table which while offering improved technical and solidity characteristics is of extremely simple structure with respect to bagatelle tables of the traditional type.

A further object of this invention is to provide a bagatelle table the effective overall dimensions of which are reduced to a minimum, so as to facilitate its transportation and storage.

A further object of this invention is to provide a bagatelle table which is easily constructed starting from elements commonly available commercially, which is practical and functional, and which is also highly competitive from a purely economical point of view.

These and further objects, which will be more evident hereinafter, are attained by a bagatelle table according to the invention, comprising a support frame constructed in a single piece, a playing surface supported by said frame, means for propelling a ball on to said playing surface, a pair of repelling arms disposed close to one end of said playing surface, and pushbutton means for operating said repelling arms, and comprising a plurality of obstacles having shaped feet of resilient material for being irremovably insertable by pressure into holes provided in said playing surface.

BRIEF DESCRIPTION OF THE DRAWINGS

Further characteristics and advantages will be more evident from the detailed description of a bagatelle table illustrated by way of example in the accompanying drawings in which:

FIG. 1 is a perspective view of the bagatelle table according to the invention;

FIG. 2 is a perspective view of an obstacle;

FIG. 3 is a perspective view of an obstacle seen from its lower side;

FIG. 4 is a detailed sectional view showing the insertion of the obstacle into the playing surface;

FIG. 11 is a view from below of the bagatelle table according to the invention;

FIG. 12 is an exploded view of the pushbutton means;

FIG. 13 is a plan view of the pushbutton means associated with the repelling arms;

FIGS. 14 and 15 are longitudinal sections through the pushbutton means in two different working positions;

FIG. 16 is a detail of a support foot for the bagatelle table;

FIG. 17 is a section through a foot fixed to the bagatelle table according to the invention.

DESCRIPTION OF THE PREFERRED EMBODIMENT

Figure 5:
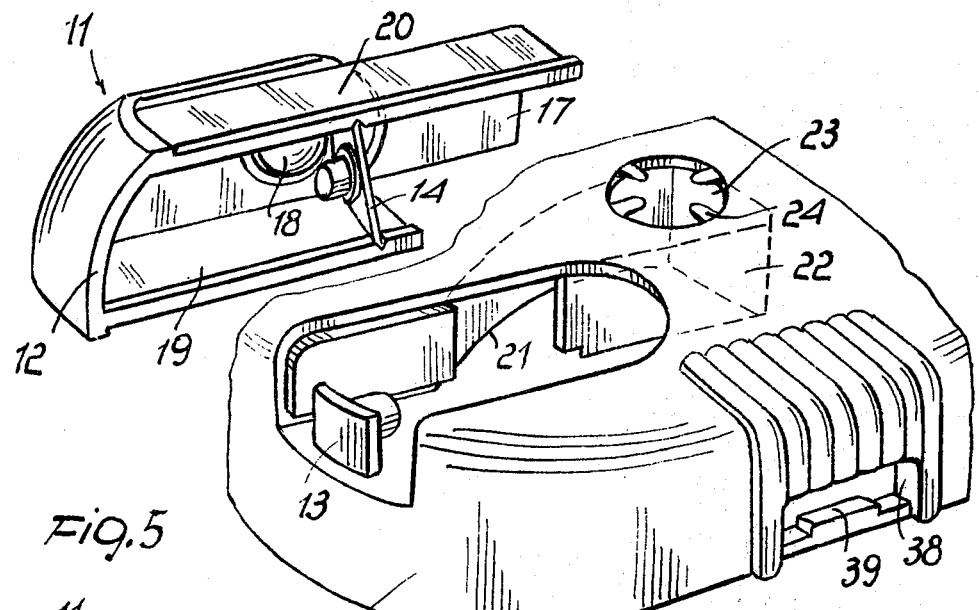
FIG. 5 shows to an enlarged scale that part of the bagatelle table which comprises the propelling means.
Figures 6, 7:
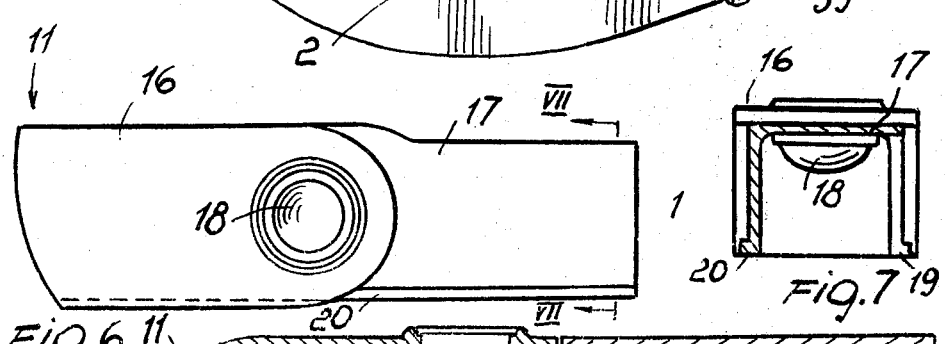
FIG. 6 is a plan view of the propelling means.
FIG. 7 is a section on the line VII—VII of FIG. 6.
Figure 8:
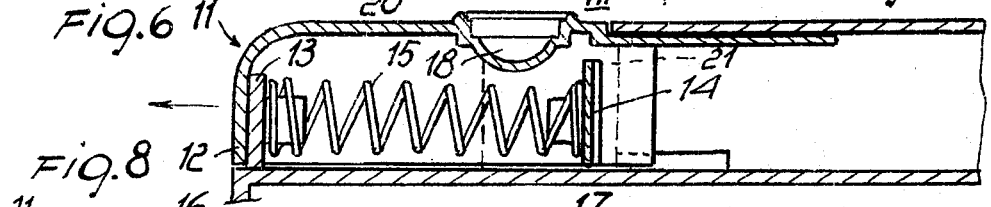
FIGS. 8 and 9 are longitudinal sections through the propelling means in two different working positions.
Figure 9:
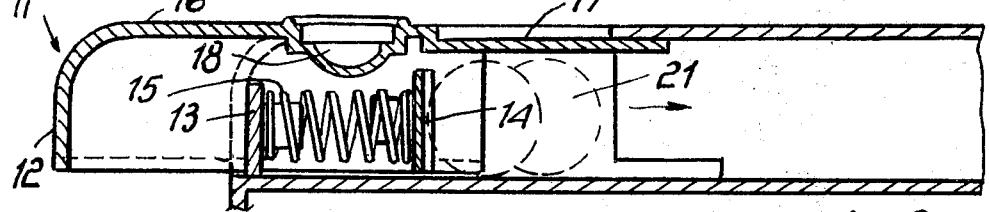
Figure 10:
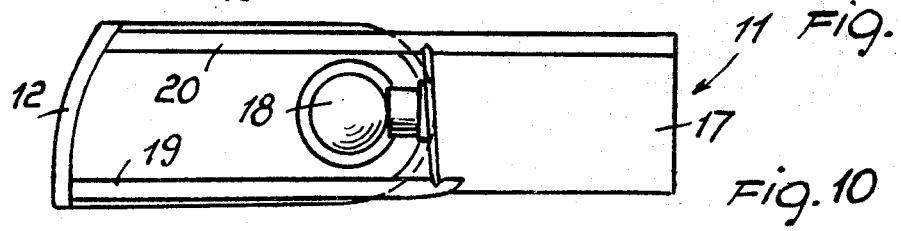
FIG. 10 is a view from below of the propelling means.

With reference to the stated figures, the bagatelle table 1 comprises a support frame 2, preferably constructed in a single piece in plastics material, inside which is supported a playing board 3 having an upper and a lower face.

On said playing board 3 is disposed a plurality of obstacles 4; the obstacles 4 comprise two walls 5 joined together along one edge and enclosing an angle between them. The walls 5 comprise an upper cover element 6 of semicircular shape, and spaced parallel feet 7, extending from each free edge of said walls 5. At the end of the feet 7 there is a head with a hooked projection 8 defining an upper ledge 9 spaced from the lower edge of the walls 5 by an extent substantially equal to the thickness of the playing board 3, as visible from FIG. 4. The feet are made of resilient material, as deducible from FIG. 4.

The obstacles 4 are fixed to the playing board 3 by inserting said feet 7 into corresponding holes 10 suitably provided in the playing board 3. As visible particularly from FIG. 4, the holes 10 have a constant cross section throughout the board 3.

The insertion of the obstacles 4 into the board 3 comes about, as better shown in FIG. 4, by the resilient bending of the feet 7 which enables the hook projection 8, which has a cross size slightly larger than the holes 10, to pass beyond the hole 10. When the projection 8 has passed into the hole 10 the foot straightens itself again and the ledge 9 prevents the removal of the obstacles from the board 3 by engaging with the lower face of the board 3 while the walls 5 connecting the feet 7 engage the upper face of the board 3.

As can be seen by this means the obstacles are easily and rapidly fixable by pressure, and can no longer be removed once fixed, this factor guaranteeing the stability of the obstacles.

The bagatelle table 1 also comprises propelling means for a ball which are disposed on the lower side of the frame 2 to the right.

Said propelling means consist of a drawer 11 of essentially box shape, which in the rest position is in line with said frame 2 and can slide in it so as to propel the ball.

The construction of the propelling drawer 11 will now be described in greater detail. It comprises a curved wall 12 which in the rest position abuts against a heel 13 provided at the end of the frame 2. Opposite said curved wall 12, the drawer 11 comprises an inclined wall 14 the inner surface of which acts as a stop for a spring 15 acting between said heel 13 and said inclined wall 14.

The drawer 11 further comprises an upper cover wall 16 from which there extends an appendix 17, which lodges below the exposed surface of the frame 2 so as to act as a guide and retention element for said drawer 11 inside the frame 2.

On the cover element 16 there is provided a cavity seat 18 into which the finger of the player is placed in order to operate the drawer 11 and propel the ball.

In addition the drawer element 11 comprises a lateral left wall 19 which extends from the curved wall 12 to the inclined wall 14, while the lateral right wall 20 starts at the curved wall 12 and extends over the entire length of the drawer to the end of the appendix 17, the lateral right wall 20 also having the purpose of guiding the drawer during its sliding.

The lateral left wall 19 is shorter than the lateral right wall 20, so that when the drawer 11 is extracted, the opposing action of the spring 15 is overcome and the opening 21 is uncovered, through which a container element 22 can introduce a ball in front of the inclined wall 14 and hence enable the propulsion to be effected.

In the rest position the lateral wall 19 closes the opening 21 and thus prevents the balls from accidentally leaving the container element 22.

The container element 22 comprises a through aperture 23 provided in the frame 2 with peripheral strips 24 which allow the balls to be introduced from above and prevent their accidental exit if the bagatelle table is overturned.

Thus to operate the drawer 11 it is sufficient to insert a finger into the cavity seat 18, pull the drawer 11 to overcome the opposing action of the spring 15 and then free the drawer which, because of the action of the spring, will return to its initial position, propelling a ball into play, which will run along a propelling channel 25 at the end of which there is a resilient strip 26 which prevents the ball from re-entering the channel 25.

On the exposed surface at the lower end of the playing surface 3 are provided two repelling arms 30 disposed opposite and close to each other and spaced apart so as to leave a free space between them.

Said repelling arms 30 are operated by a pair of pushbutton means which are slidably supported by said frame 2 and are disposed in opposing positions on the two lateral sides of the frame 2.

The pushbutton means comprise two pushbuttons 31 of boxlike shape having a completely closed outer face 32, and opposing this a face 33 in which there is a slot 34 for the passage of a lever 35 comprising a shaped head 36 at one end thereof which is retained after snap insertion in a seat 37 provided inside said pushbutton element 31.

Each of the pushbuttons 31 is slidably housed in an aperture 38 provided in the lateral side of the frame 2, the aperture 38 comprising a projecting tooth 39 which acts as a stop for the pushbutton 31 when it is pressed, i.e. by abutting against the outer face 32 it prevents the pushbutton from passing into the frame 2. On the face 33 opposite the face 32 is provided a seat 40 which enables the pushbutton 31 to be assembled and to slide inwards so avoiding interference with said tooth 39.

Said lever 35 comprises near the end opposite the shaped head 36 a pair of spaced through holes 41, one of which engages with a pin extending below and projecting from said arms 30.

With the described construction, i.e. with a lever comprising two spaced holes 41, the use of different levers for the left and right pushbutton is avoided, the levers in fact being analogous and one or other of the holes 41 being used depending upon whether the pushbutton concerned is the right or the left pushbutton.

In addition a spring 42 is provided around the lever 35, acting between the face 33 of the pushbutton and a fixed projection 43 integral with the frame 2 and projecting below the playing surface 3. The projection 43 defines a guide for the lever 35 and a support for the spring 42. The spring 42 is compressed when the pushbutton is pushed and as soon as the pushbutton is freed it returns to its initial position.

In the embodiment described, the pushbutton 31 has been arranged in such a manner that it is in line with the frame 2 when it is pressed, this fact enabling the overall dimensions of the bagatelle table to be kept within the dimensions of the frame 2, and avoiding dead spaces during packaging.

On the lower face of the playing surface 3 at the front margin thereof below the frame 2 there are two cylindrical recesses 50 into which the support feet 60 of the bagatelle table are inserted by pressure, during transport and packaging, that is when the bagatelle table is not in use.

Each support foot 60 is essentially cup shaped and comprises an outer surface portion 61 of essentially frusto-conical shape, so as to favour its pressure insertion into the cylindrical recess 50.

Within the portion 61 of said support foot 60 there is an inner substantially cylindrical portion 62 spaced from the outer portion 61 and having a protuberance 64 at its summit, disposed on the inside end close to the free end of the portion 61, and defining an annular shoulder 63. The protuberance 64 has a cylindrical shape provided with peripheral ribs 65, and defines internally an annular recess 66 surrounding a flexible stem 67 the free end of which is in line with the free end of the protuberance 64. As visible in FIG. 17, the protuberance 64 and the annular shoulder 63 and recess 66 define means for engaging with corresponding portions of the frame 2.

In fact, on the lower face of the frame 2 and close to its rear end are provided means for matingly engaging the cup shaped support feet 60, these means comprising two shaped seats 70 into which said support feet 60 are inserted during play, the purpose of the feet 60 being to keep the bagatelle table 1 and hence the playing surface 3 inclined towards the repelling arms 30.

The seats 70 each comprise a central core 71 which comprises internally a cavity 72 arranged to receive the flexible stem 67. Around the central core 71 and concentric with it there is provided a cylindrical hollow support portion 73 of diameter equal to that of the said annular shoulder 63 for engaging therewith and comprising a free edge 75 lying in a plane sloping towards the front end of the bagatelle table.

The purpose of the inclination of the free edge 75 is to give the possibility of movement to the support foot 60 which is retained in the seat 70 by the flexible stem 67, and hence offer the possibility of a secure support, absorbing any irregularities in the support surface on which the bagatelle table is rested by inclination of the support foot 60.

From the description it can be seen that the bagatelle table according to the invention attains all the proposed objects and in particular that it is of extremely simplified construction, all necessary manufacturing operations having been reduced to a minimum.

Further it is emphasized that the overall dimensions of the bagatelle table are reduced to just the dimensions of the frame 2, the bagatelle table not comprising those projecting parts normally consisting of the propelling drawer for the balls and the pushbuttons which are not completely housed in the body of the bagatelle table.

Although best results are obtained using plastics materials, in practice the materials used and the dimensions and shapes may be chosen at will according to requirements.

I claim:

1. A game board structure comprising a support frame constructed in a single piece, a playing board supported by said frame and having an upper and a lower face, means for propelling a ball on to said playing board, a pair of repelling arms disposed close to one end of said playing board, two pushbuttons for operating said repelling arms, said two pushbuttons being slidably supported in opposing positions on the lateral sides of said frame and being in line with said frame after having been pushed, and further comprising a plurality of holes of constant cross section provided in said playing board and a plurality of obstacles irremovably inserted in said holes, said obstacles each comprising spaced parallel feet and means for connecting said feet of said each of said obstacles together, said feet each comprising a head having a hooked projection defining a ledge spaced from said connecting means by an extent substantially equal to the thickness of said playing board, said feet being made of resilient material and said head having a cross size slightly larger than said holes and being arranged to pass beyond said holes provided in said playing board by the resilient bending of said feet, said ledge adhering to the lower face of said playing board while said connecting means adhere to the upper face of said playing board preventing said feet from being removed through said holes, and further including a pair of levers, each of said levers connecting one of said pushbuttons with one of said repelling arms, and each of said levers having a shaped head at one end thereof, each of said pushbuttons having a seat arranged internally thereof for snap engagement with a corresponding one of said shaped heads of said levers, said levers each comprising near the other end two spaced through holes, said repelling arms each having a pin extending therebelow and projecting therefrom, the pin of one of said repelling arms rotatably engaging a corresponding one of said through holes of one of said levers and the pin of the other of said repelling arms rotatably engaging the corresponding other of said through holes of the other of said levers.

2. A game board structure as claimed in claim 1, in which said playing board comprises two cylindrical recesses defined within the lower face of the playing board below said frame near one side thereof and two shaped seats near the opposite side of said frame, the game board structure further including a pair of support feet, said recesses being shaped for housing said support feet of the game board structure when it is not in use and said shaped seats being shaped for engaging said support feet during periods of play.

3. A game board structure as claimed in claim 1, further comprising substantially cup shaped support feet having an outer portion of substantially frusto-conical shape and an inner substantially cylindrical portion spaced from said outer portion and having a ribbed protuberance defining an annular shoulder at its summit and an annular recess inside said protuberance surrounding a flexible stem, said frame having means for mating engagement with said cup shaped support feet.

4. A game board structure as claimed in claim 3, in which said frame has a substantially elongated rectangular shape, whereby the frame includes two pairs of opposing sides, one of which is comprised of sides each of a length shorter than each of the sides of the other of the pairs of sides thereof, said frame comprising on the lower face near one of the short sides thereof seats for receiving said support feet during periods of play, said seats each comprising a central core with an internal cavity arranged to receive said flexible stem, a hollow cylindrical support portion arranged around and concentrically to said central core, said hollow cylindrical support portion having a diameter substantially equal to that of said annular shoulder for engaging therewith and comprising a free edge lying in a plane sloping towards the other of the short sides of said substantially rectangular frame.

5. A game board structure as claimed in claim 1, further comprising two spaced projections integral with said frame on the lower face thereof, said projections each having a through hole defining a guide for a corresponding one of said levers, and further comprising two return springs each cooperating at one end with a corresponding one of said projections and cooperating at the other end with a corresponding one of said pushbuttons.

* * * * *